(12) United States Patent
Lean et al.

(10) Patent No.: US 8,025,139 B2
(45) Date of Patent: Sep. 27, 2011

(54) CLUTCH

(75) Inventors: Norman Lean, Taipei (TW); Chun-Yi Wu, Miaoli Hsien (TW)

(73) Assignees: Heui Tuan, Hsinchu (TW); Chun-Yi Wu, Miaoli Hsien (TW); Pei-Hsuan Wu, Hsinchu (TW)

( * ) Notice: Subject to any disclaimer, the term of this patent is extended or adjusted under 35 U.S.C. 154(b) by 1026 days.

(21) Appl. No.: 11/763,456

(22) Filed: Jun. 15, 2007

(65) Prior Publication Data

US 2008/0053783 A1   Mar. 6, 2008

(30) Foreign Application Priority Data

Jun. 16, 2006   (TW) .............................. 95121502 A

(51) Int. Cl.
F16D 43/18   (2006.01)
(52) U.S. Cl. .............................. 192/105 CD; 192/55.61
(58) Field of Classification Search ............... 192/55.61, 192/105 CD, 105 CP
See application file for complete search history.

(56) References Cited

U.S. PATENT DOCUMENTS 4,653,620 A * 3/1987 Czajkowski et al. ....... 192/17 R

* cited by examiner

Primary Examiner — David D Le
Assistant Examiner — Ryan Dodd
(74) Attorney, Agent, or Firm — Leong C. Lei

(57) ABSTRACT

A clutch having high engaging force and featuring of smooth operation, wherein clutch weights that are biased by return elements are subject to thrusting force caused by constraint sections of a main driving plate that receive and convert torque from an engine into the pressing action against engaging slots defined in the clutch weights so as to gain enhanced engaging force even when the minor difference or error existing on the response time of the clutch weight or the strength of the return elements and also provides anti-reversal function to reduced the oscillation and let the power output more smooth and more stable. Accordingly, slippage of clutch and wear of the clutch wear pad are both reduced and temperature rise of the wear pad is also reduced.

10 Claims, 22 Drawing Sheets

| Test Item: Static Engaging Torque (Braking Power) of Clutch Against Clutch Bell ||||
|---|---|---|---|
| pneumatic pressure (simulation of centrifugal pressing force of brake shoe) (kg/cm²) | clutch engaging torque (N-m) || increased percentage (%) of engaging torque of the present invention |
| | conventional clutch* | clutch of the invention (second embodiment)** | |
| 2 | 5.7 | 7.8 | +36.8% |
| 3 | 8.5 | 11.8 | +38.8% |
| 5 | 13.2 | 18 | +36.4% |
| 6 | 15.3 | 21 | +37.3% |
| Remarks | * conventional clutch of Grand Dink 250, clutch bell, φ 153mm<br>** the clutch of the second embodiment of the present invention [structure A, without transmission member], applicable to Grand Dink clutch bell, φ 153mm<br>*** using torque meter to measure the engaging resistance of the clutch brake shoe against clutch bell |||

FIG. 21

| Test Item: On-Vehicle Clutch Test (Vehicle Load: 160kg) | | | | | |
|---|---|---|---|---|---|
| Type of clutch | Transmission member (coil spring)/deformation setting (being deformed) N-m | engine revolution (rpm) at vehicle starting to move | | interface temperature rise/generation of odor for clutch wear pad | slope of road |
| | | conventional clutch | clutch of the present invention (second embodiment) | | |
| 1. conventional | --- | 3800 | --- | minor | 10 degrees |
| 2. The present invention, structure A* | No/No | --- | 3000 | none | 10 degrees |
| 3. The present invention, structure B** | Yes/8 | --- | 3300 | none | 10 degrees |
| 4. conventional | --- | 4200 | --- | significant odor | 20 degrees |
| 5. The present invention, structure A* | No/No | --- | 3200 | none | 20 degrees |
| 6. The present invention, structure B** | Yes/8 | --- | 3600 | none | 20 degrees |
| Remarks | * and ** the clutch of the present invention in the test, for both structure A and B, is constructed the same as the second embodiment, the difference being that structure A contains no transmission member, but structure B does, the deformation setting of the transmission member is 8 N-m | | | | |

FIG. 22

CLUTCH

BACKGROUND OF THE INVENTION (a) Technical Field of the Invention

The present invention relates to a clutch that enhances engaging power, and in particular to a clutch of high engaging power and featuring stable engagement, which increases the engaging power of each clutch shoe to smoothen and stabilize power transmission.

(b) Description of the Prior Art

A centrifugal clutch is widely used in an automatic transmission mechanism of a motorcycle. The centrifugal clutch functions to reflect the rotational speed of a driven pulley to cause clutch weights that are in pivotal connection with a base to expand the clutch weights, in response to the increasing of rotational speed, for causing the wear pads to engage a rim of a driven disk and thus transmitting power to a driven shaft for driving wheels of motorcycles forward. When the rotational speed is reduced, the clutch weights are moved inward and closed to each other, and the transmission of power to the driven shaft is cut off. To allow the clutch weights to reflect the variation of rotational speed and to induce effective engagement, each clutch weight is provided with tension spring (return element) on opposite sides of the pivotal point and connecting between adjacent clutch weights. Timing of expansion/closing of the clutch weights is determined by the tension of the spring.

Theoretically, every two adjacent clutch weights are constrained by the inter-connecting spring. The response characteristics of each clutch weight in action and angle of expansion/closing operation due to outward movement caused by rotation can be made the identical if the tension of all the springs are the same. However, in practice, the base is often in a non-constant speed rotation due to the fact that the rotational speed of the driven pulley is subject to variation by different operations of the acceleration pedal in response to different driving conditions. This makes the centrifugal force of each clutch weight exhibiting difference in response timing. Thus, during the outward expansion and inward closing process, the clutch weight is subject to unstable expansion, leading to oscillatory phenomena of engaging, which causes the transmission of power unstable.

SUMMARY OF THE INVENTION

The primary purpose of the present invention is to provide a clutch that has a high engaging force and realizes stable engagement.

In view of this, the present invention provides a clutch comprising a base plate assembly comprising a plurality of clutch weights and return elements provided to the clutch weights, wherein the base plate assembly comprises at least one main driving plate and an associated driven plate, the main driving plate forming a plurality of constraint sections corresponding to the clutch weights respectively, the main driving plate being allowed to drive the associated driven plate to corotate in an angularly-offsetting manner, the associated driven plate carrying the clutch weights, each clutch weight installed with an engaging slot for being engaged by the respective constraint section.

As such, with the practice of the above discussed techniques, the base plate assembly in accordance with the present invention, when put in a gradually increasing speed condition, enhances the engaging force of each clutch weight against a rim of a driven disk by means of a pressing effect induced by the variation of displacement that the respective constraint section takes to engage an inner abutting face of the engaging slot of the clutch weight when the constraint section receives torque from an engine and the solid engaging process ensures an anti-reversal function, which facilitates smoothness and stability of power transmission so as to increase added value of a clutch product and to enhance market competitively and economic value.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 21 is a table showing the result of static engaging torque of the present invention; and FIG. 22 is a table showing the road text or field test of the present invention.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
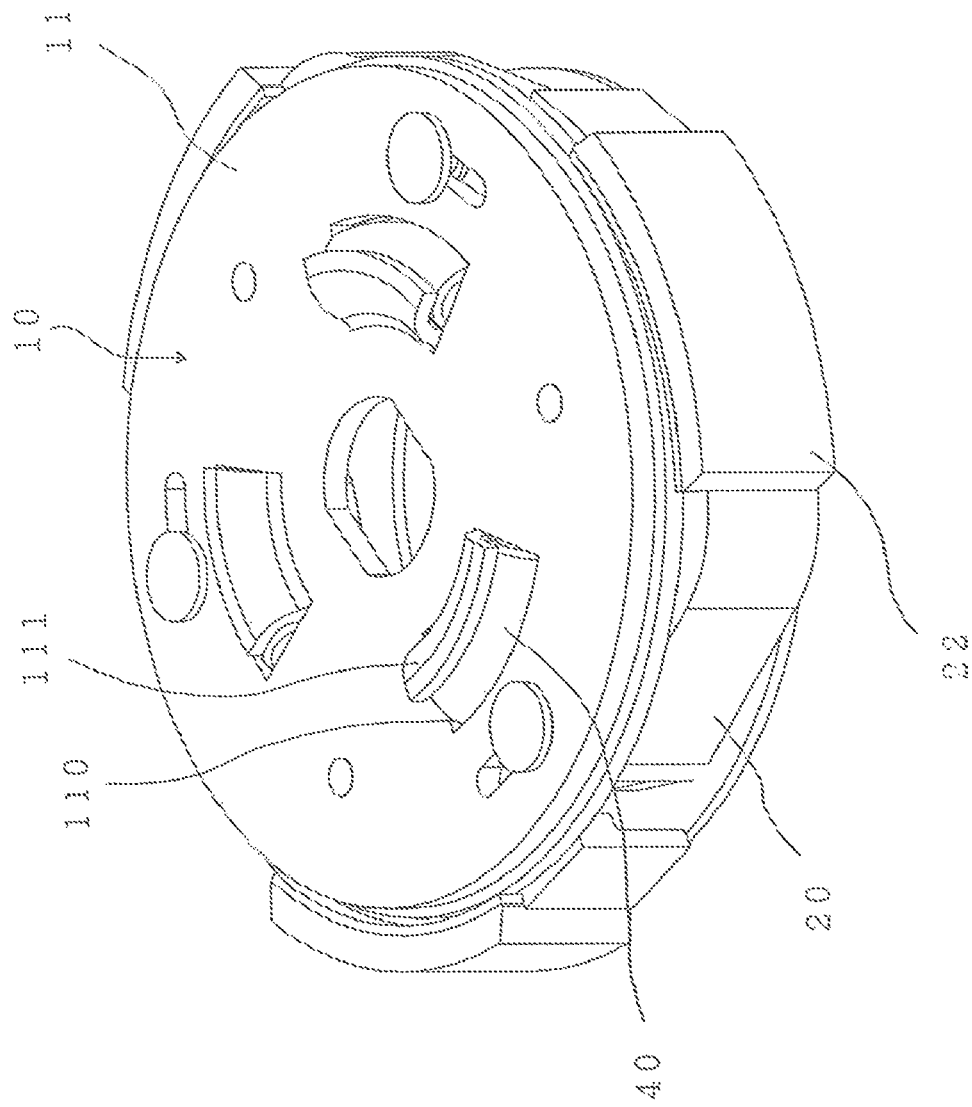
FIG. 1 is a perspective view of a clutch constructed in accordance with a first embodiment of the present invention.
Figure 2:
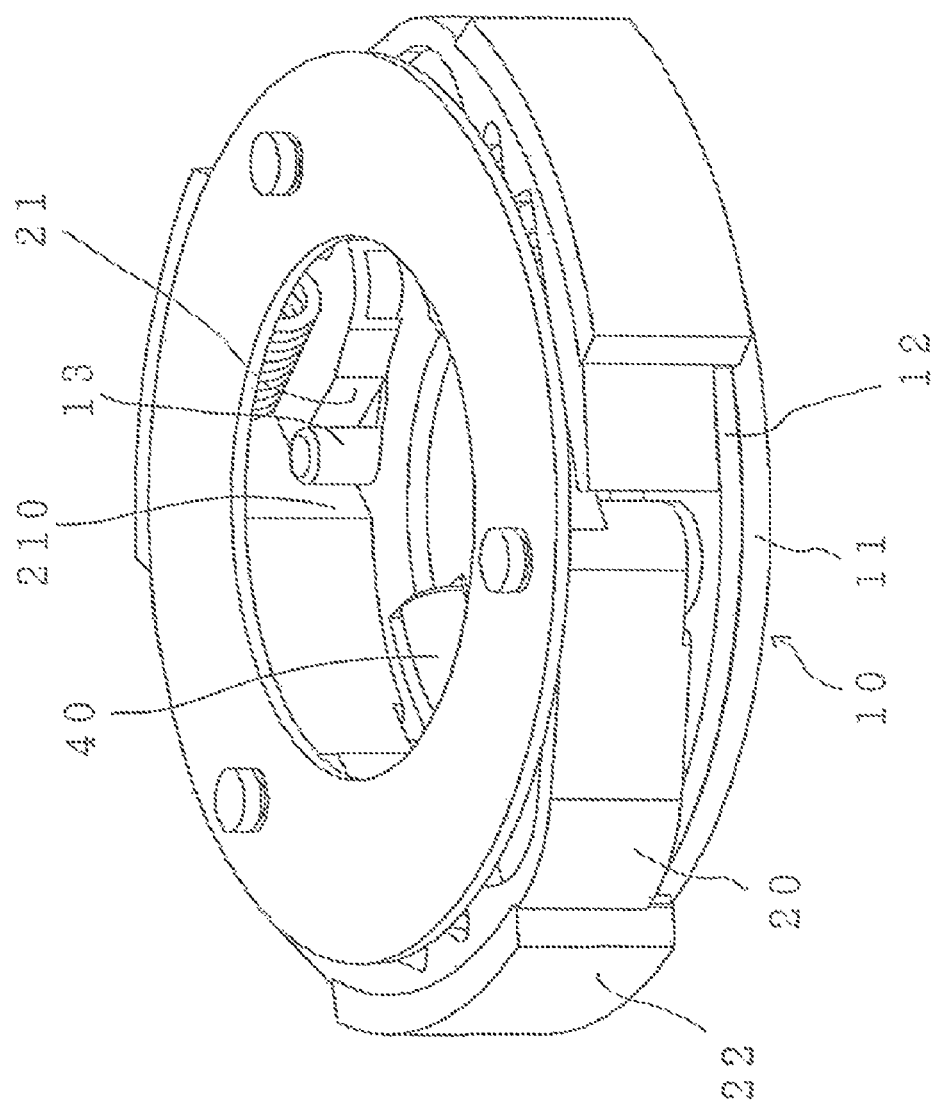
FIG. 2 is another perspective view of the clutch in accordance with the first embodiment of the present invention.
Figure 3:
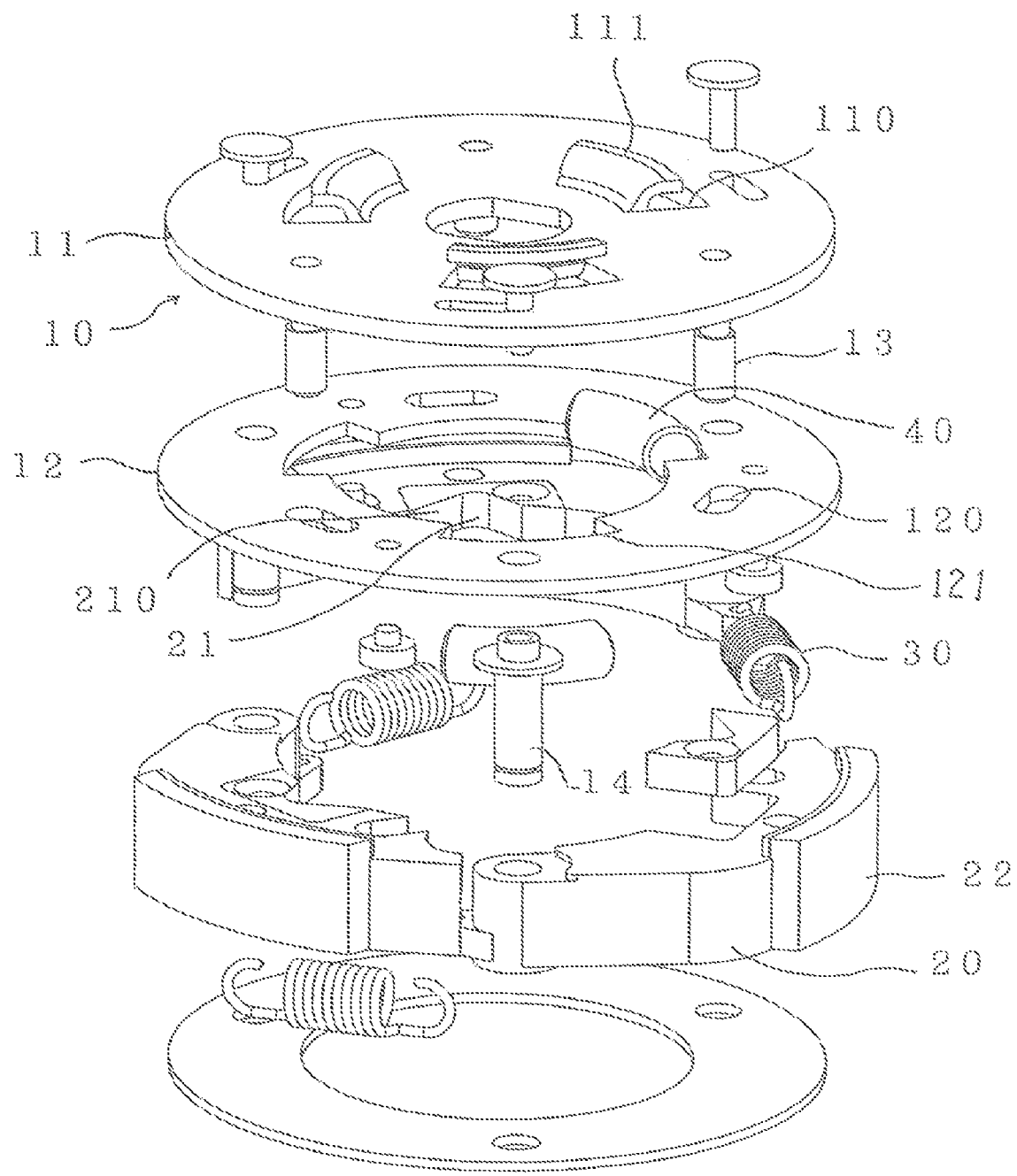
FIG. 3 is an exploded view of the clutch in accordance with the first embodiment of the present invention.
Figure 4:
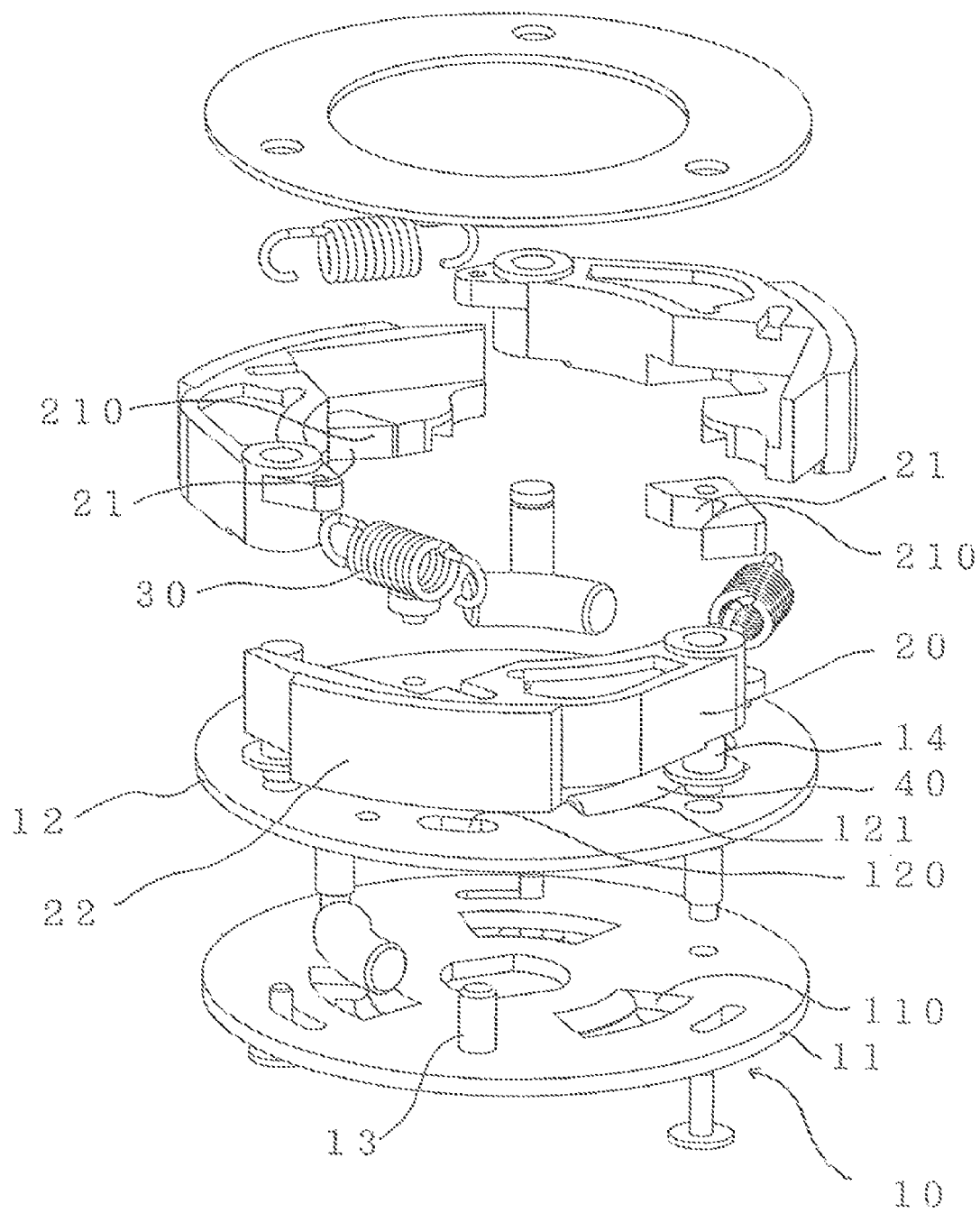
FIG. 4 is another exploded view of the clutch in accordance with the first embodiment of the present invention.
Figure 5:
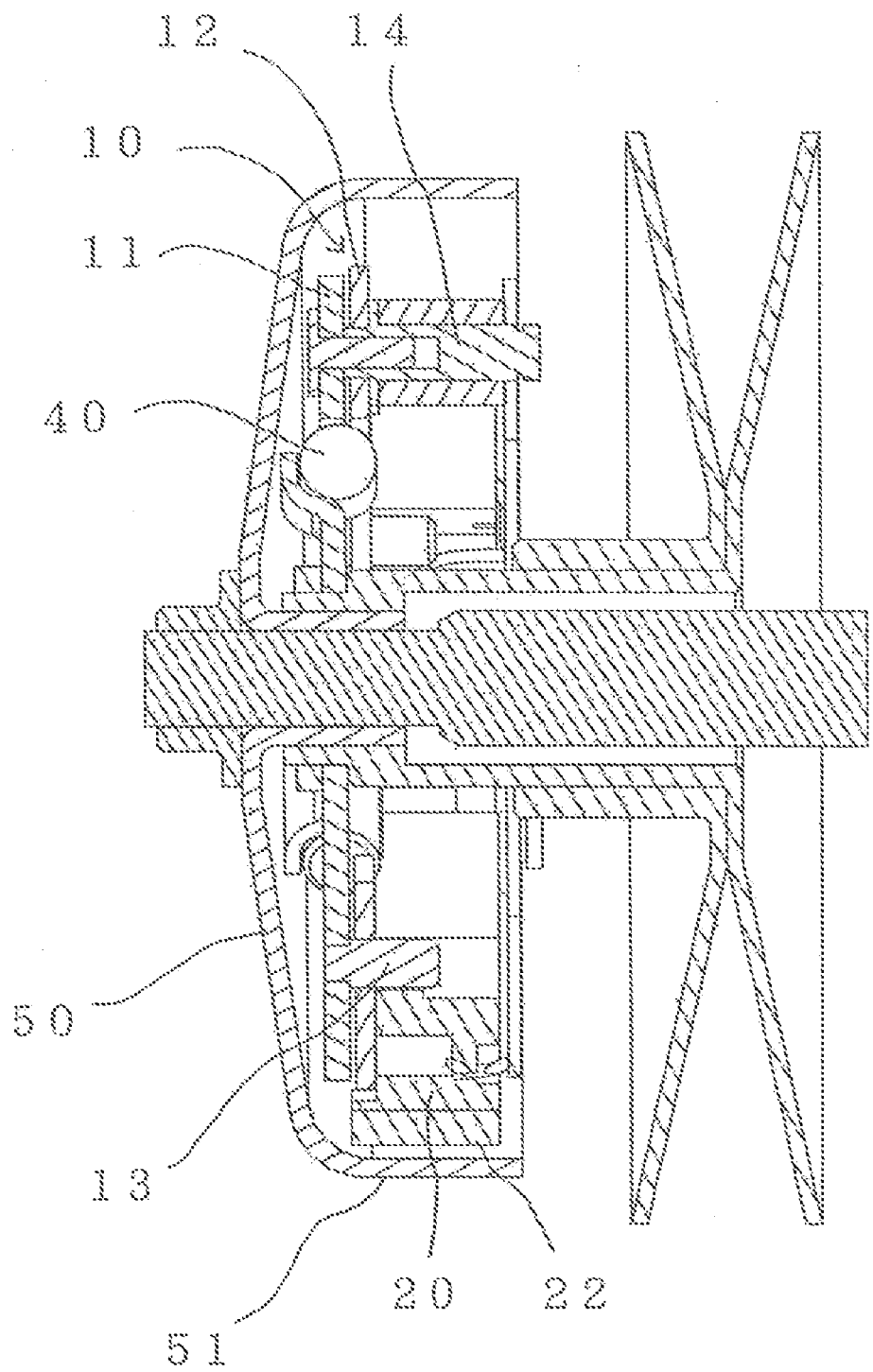
FIG. 5 is a cross-sectional view of the clutch in accordance with the first embodiment of the present invention in an assembled condition.
Figure 6:
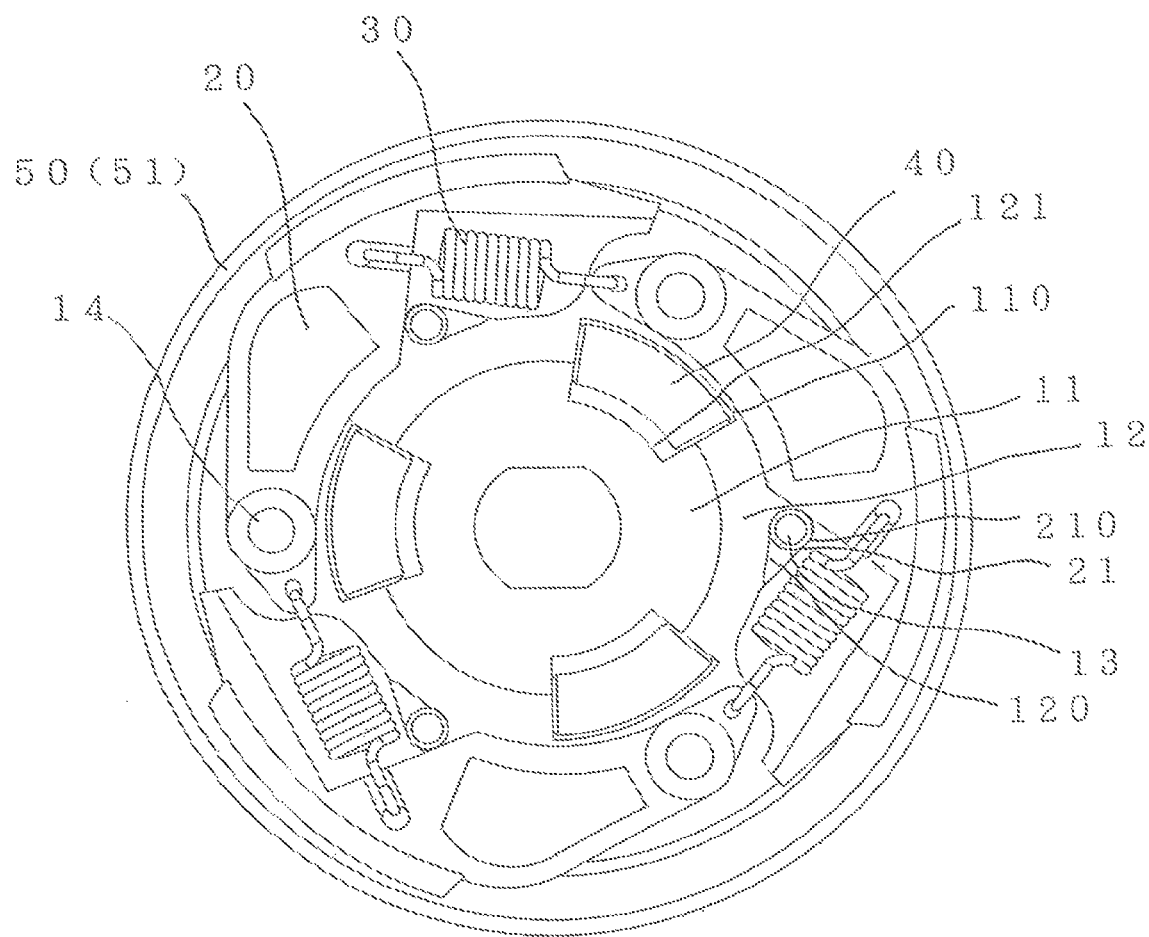
FIG. 6 is a plan view of the clutch in accordance with the first embodiment of the present invention in a condition before operation; [clutch weight in closing status]
Figure 7:
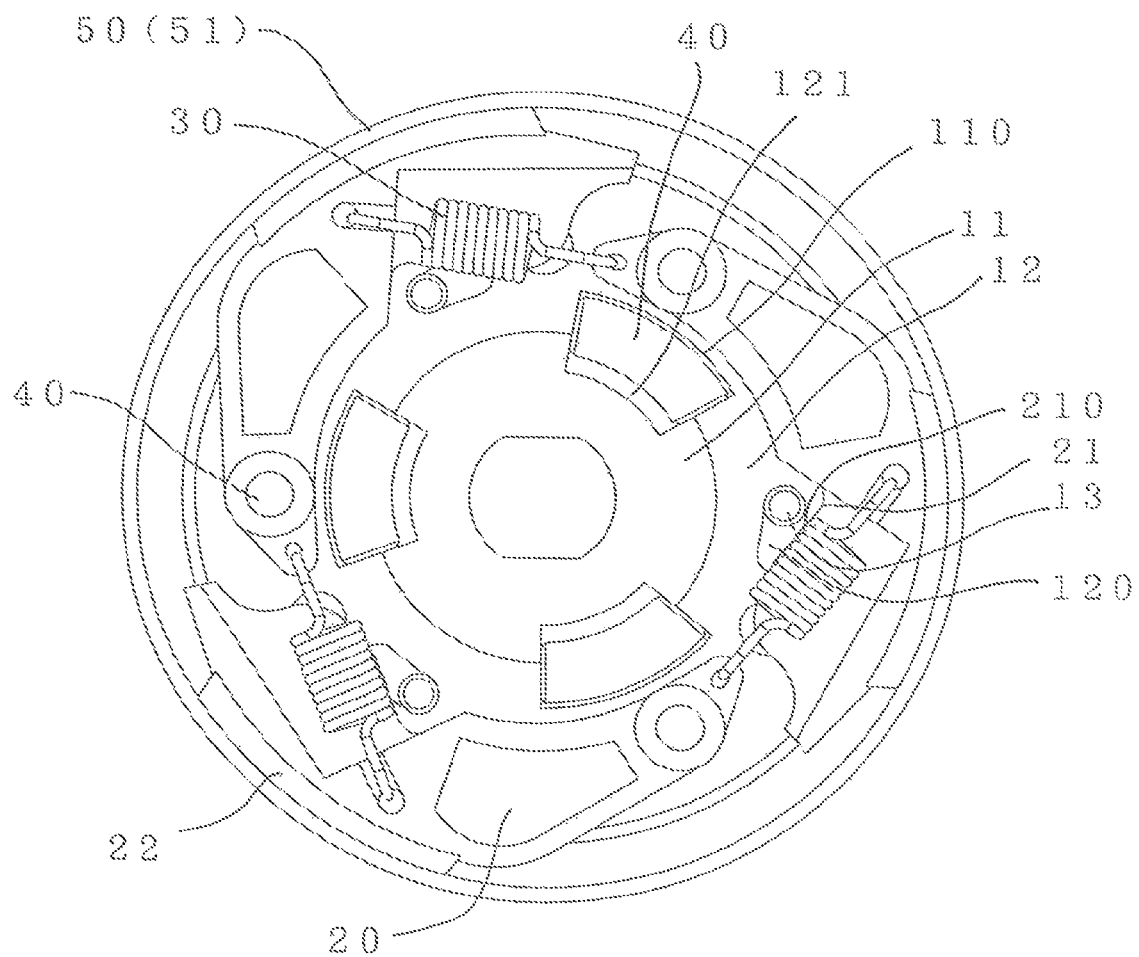
FIG. 7 is a plan view of the clutch in accordance with the first embodiment of the present invention illustrating the clutch in operation; [clutch weight slippery engaging with the driven disk]
Figure 8:
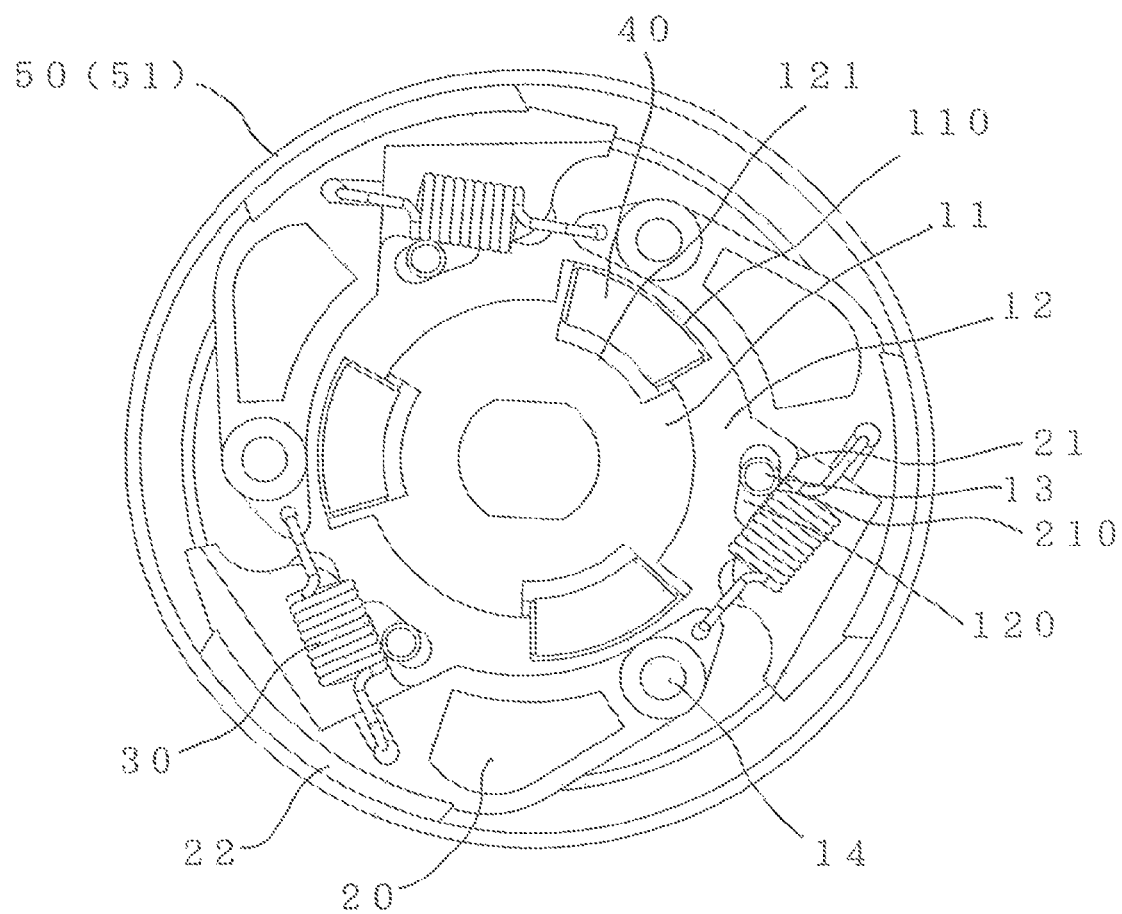
FIG. 8 is another plan view of the clutch in accordance with the first embodiment of the present invention illustrating the clutch in operation; [the constraint sections are actuated to press against the engaging slots of clutch wights]
Figure 9:
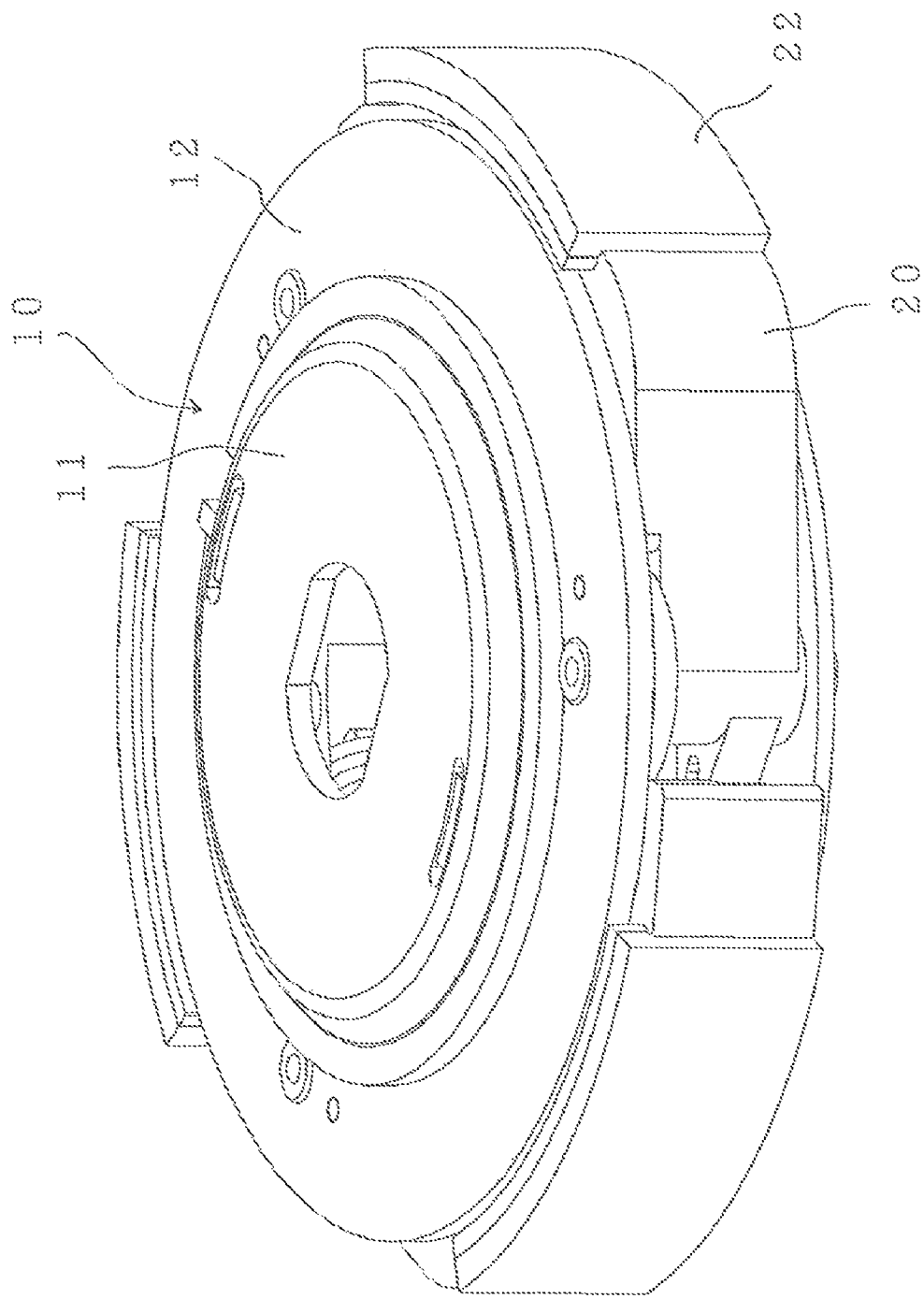
FIG. 9 is a perspective view of a clutch constructed in accordance with a second embodiment of the present invention.
Figure 10:
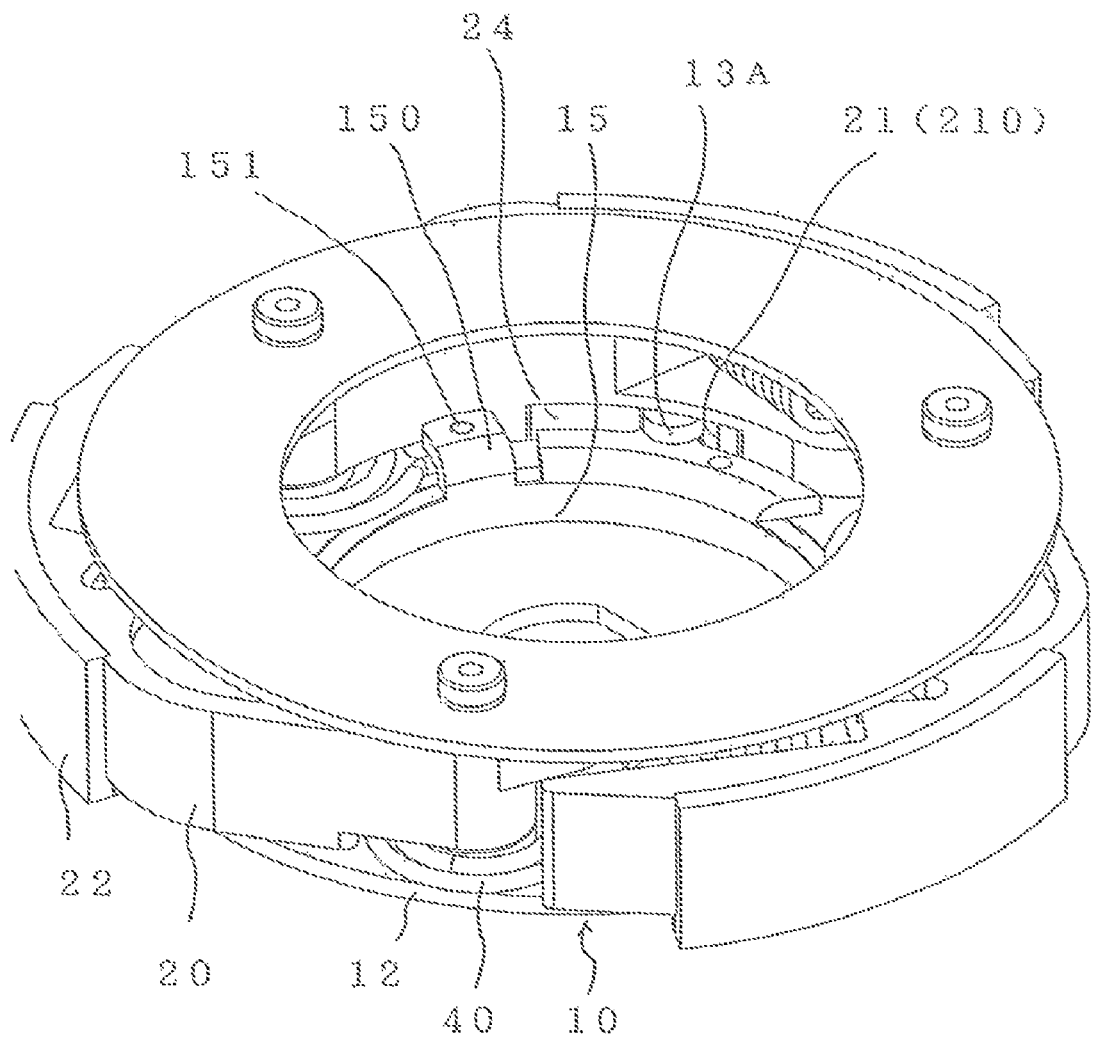
FIG. 10 is another perspective view of the clutch in accordance with the second embodiment of the present invention.
Figure 11:
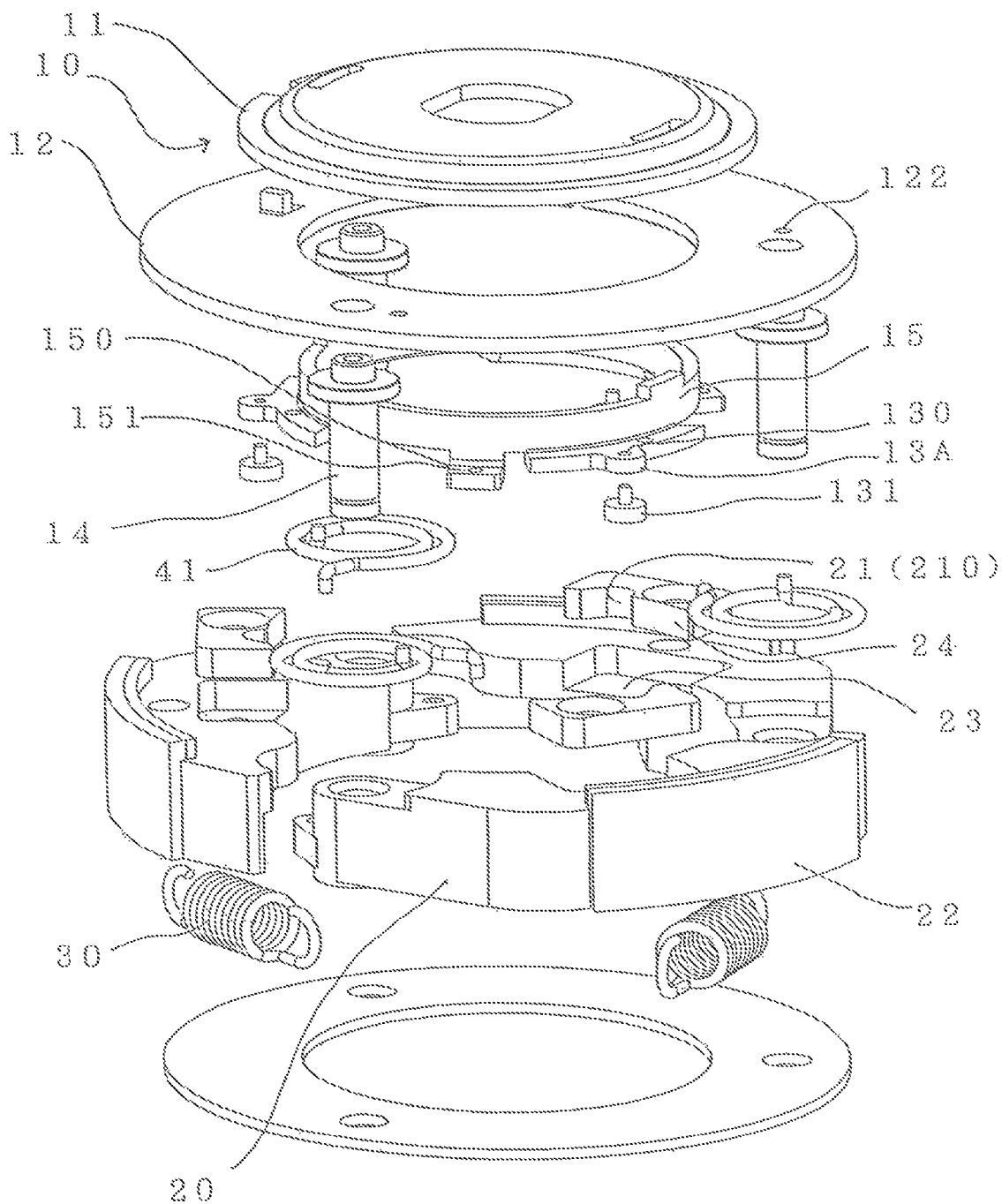
FIG. 11 is an exploded view of the clutch in accordance with the second embodiment of the present invention.
Figure 12:
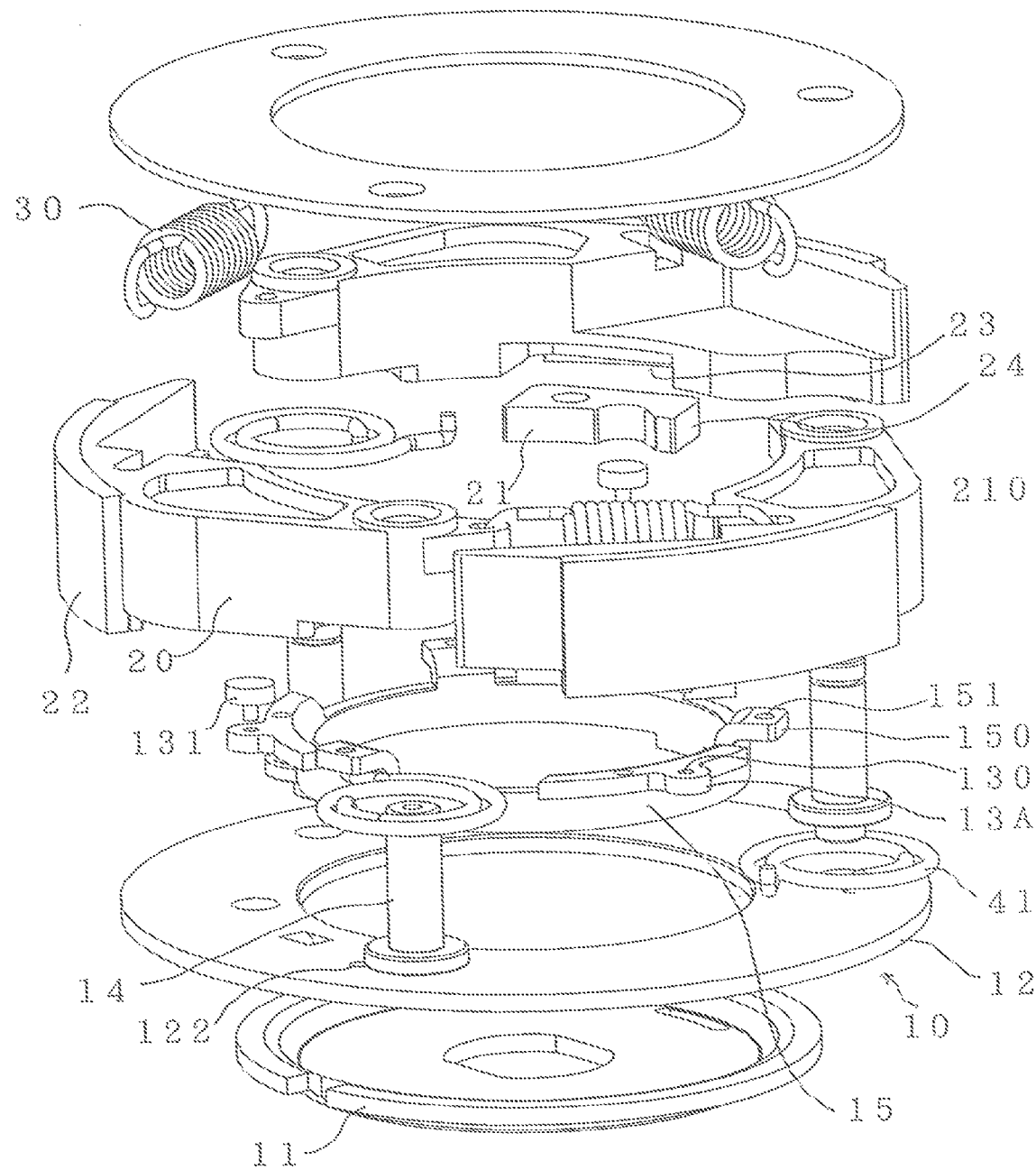
FIG. 12 is another exploded view of the clutch in accordance with the second embodiment of the present invention.
Figure 13:
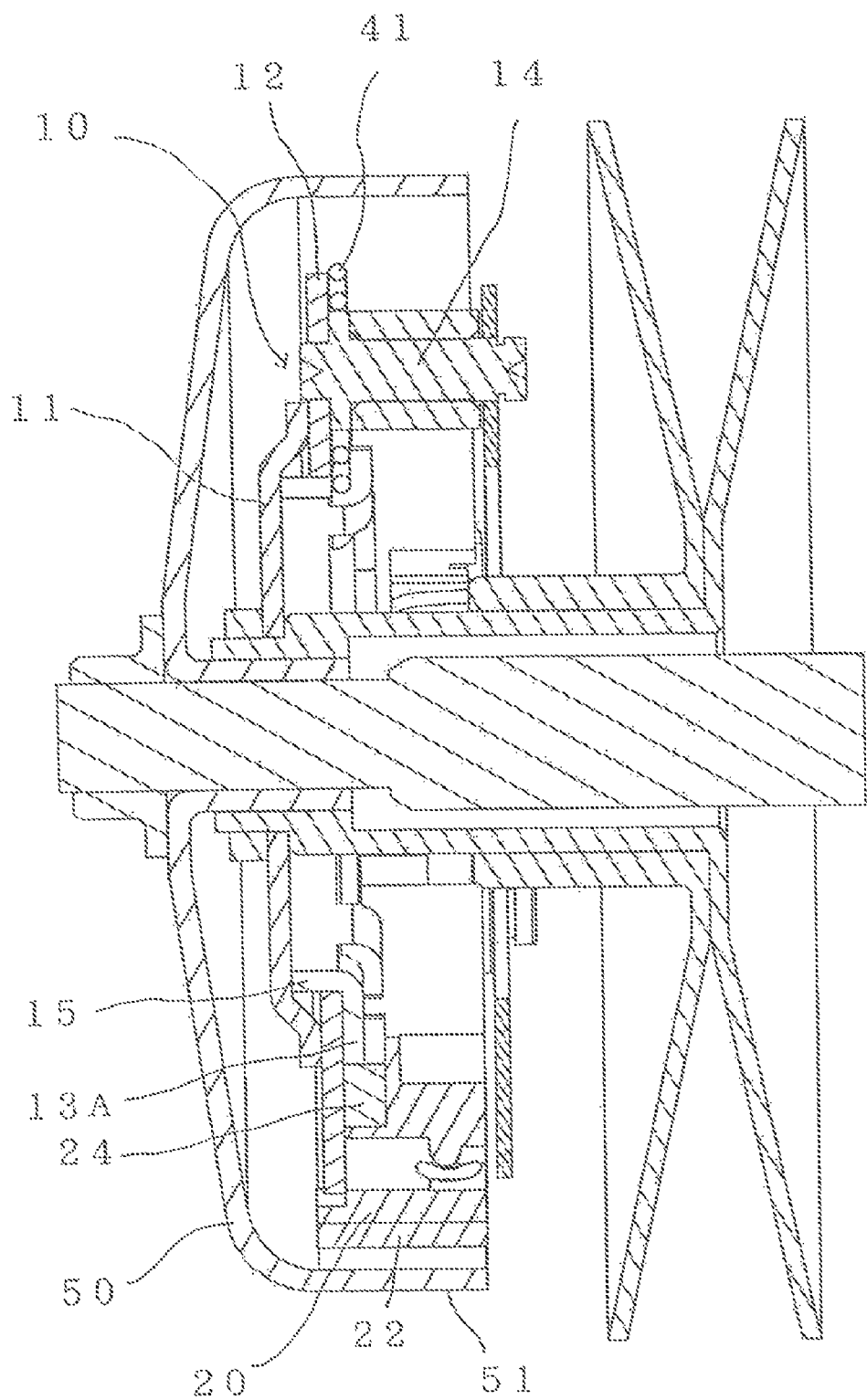
FIG. 13 is a cross-sectional view of the clutch in accordance with the second embodiment of the present invention in an assembled condition.
Figure 14:
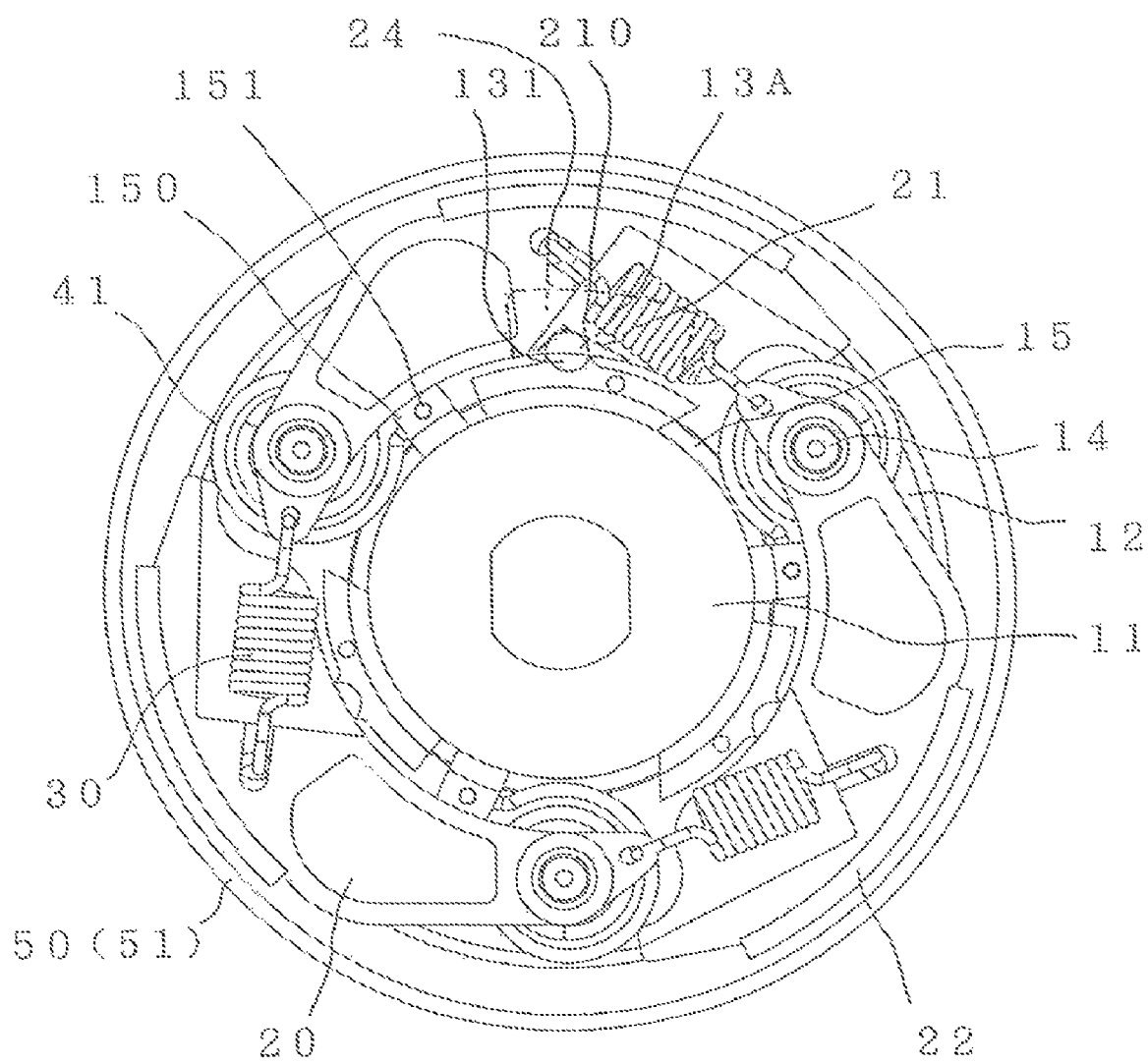
FIG. 14 is a plan view of the clutch in accordance with the second embodiment of the present invention in a condition before operation [cluth weight in closing status]
Figure 15:
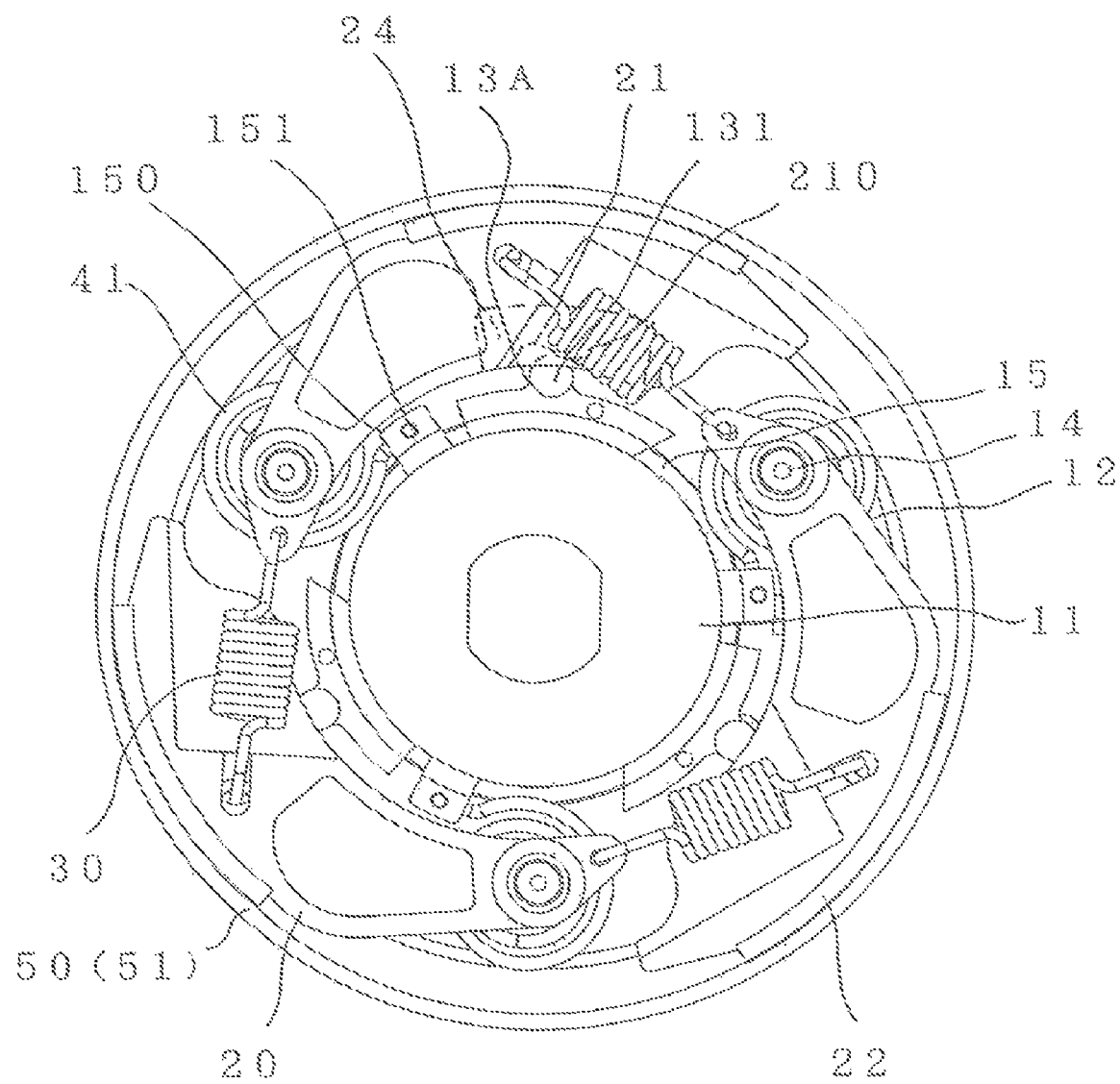
FIG. 15 is a plan view of the clutch in accordance with the second embodiment of the present invention illustrating the clutch in operation.

A clutch that has a high engaging force and smooth engagement is illustrated in FIGS. 1-6. The clutch comprises a base plate assembly 10 that rotatably carries a plurality of clutch weights 20 and a tension spring based return element 30 is connected between adjacent clutch weights 20, see FIG. 6. The base plate assembly 10 comprises a main driving plate 11 and an associated driven plate 12, wherein the main driving plate 11 is provided with a plurality of constraint sections 13 corresponding to the clutch weights 20 respectively and extending through the associated driven plate 12 and the main driving plate 11 is allowed to drive the associated driven plate 12 in an angularly offsetting manner. The associated driven plate 12 is provided with pivot pins 14 pivoting the clutch weights 20 respectively. Each clutch weight 20 has an inside surface, which forms, at a location corresponding to the respective constraint section 13, an engaging slot 21 that has an inner abutting face 210 for engaging the constraint section 13, as shown in FIGS. 5 and 6.

As shown in FIGS. 5-8, when the installed clutch is rotated and the speed is gradually increased to a certain speed, then the constraint section 13 of each clutch weight 20 will proceed displacement to press into the inner abutting face 210 of respective clutch weight 20, this pressing action enhances the engaging force of each clutch weight and makes the engagement is anti-reversal, thereby the transmission of power is more smooth and more stable.

In the practice of the present invention, as shown in FIGS. 3-6, the main driving plate 11 of the base plate assembly 10 is provided, at locations corresponding to the inside surfaces of the clutch weights 20, with the plurality of pin-like constraint sections 13, respectively, which extend through elongated curved slots 120 defined in the associated driven plate 12. The plate surface of the main driving plate 11 forms a plurality of intermediate corotating element mounting slots 110. The associated driven plate 12 is formed a plurality of receiving slots 121 corresponding to the mounting slots 110. An intermediate corotating element 40, which is compressible and resilient, is arranged in the paired mounting slot 110 and receiving slot 121. Thus, as shown in FIGS. 5-8, when the base plate assembly 10 is in a condition of gradually increasing rotational speed, an increased centrifugal force is induced to drive each clutch weight 20 outward for engagement, and when the associated driven plate 12 is subject to a resistance force, which is greater than predetermined deformation strength of the intermediate corotating element 40, the intermediate corotating element 40 will be deformed to effect angularly offsetting driving coupling between the main driving plate 11 and the associated driven plate 12, thereby allowing the pin-like constraint sections 13 of the main driving plate 11 to receive the torque transmitted from an engine and abut against the inclined abutting face 210 of the V-shaped engaging slot 21 of the clutch weight 20 to induce a pressing effect that enhances the engaging force of the clutch weight 20 applies to a rim 51 of a driven disk 50 and also effecting anti-reversal function to reduce oscillation frequency during the engaging process that the clutch weight 20 displaces outward to engage the rim 51 of the driven disk 50 so as to enhance smoothness and stability of power transmission. Such enhancement of engaging force and anti-reversal function shortens the period of slippage during which the wear pad 22 of the clutch weight 20 is in slippage with the rim of the driven disk 50 so that the abrasion/wear of the wear pad is reduced and the rise of temperature of the wear pad is also reduced, which together lead to an increase of life span of the wear pad.

The above described first embodiment of the present invention can be practiced with excellent result with the following structure, wherein the main driving plate 11 of the base plate assembly 10 is formed with a constraint flange 111 along each mounting slot 110. The constraint flange 111 functions to constrain the intermediate corotating element 40 from separation. The intermediate corotating element 40 is a rubber or plastic bar that is resistant to chemicals and is of high flexibility and compressibility, so that as shown in FIGS. 5-8, when the main driving plate 11 rotates, the intermediate corotating element 40 serves as a medium will be deformed to effect a small angle shifting between the associated driven plate 12 and the main driving plate 11 to thereby enhance the engaging force that the clutch weight 20 applies to the driven disk 50; and when the rotational speed of the base plate assembly 10 is apparently slowed down, the intermediate corotating element 40 efficiently releases the compression thereof to generate a recoiling force to immediately return the constraint section 13 back to home position, which releases the pressing effect of the constraint section 13 applies to the clutch weight 20 to allow the clutch weight 20 to easily swing back and close.

Based on the previously discussed first embodiment, the intermediate corotating element 40 that is arranged in the mounting slot 110 of the main driving plate 11 and the receiving slot 121 of the associated driven plate 12 can be substituted by a compression spring, which can serve for the same function and purposes of the rubber/plastic bar mentioned above.

Further, based on the practice of the present invention as discussed above, the present invention can achieve the same effect and function with the following second embodiment thereof, which is shown in FIGS. 9-14. The main driving plate 11 of the base plate assembly 10 is provided, on an inside plate surface thereof in an axial direction, with an operation-assisting frame 15 that extends through the associated driven plate 12. The operation-assisting frame 15 is formed, on an inner edge thereof, with a plurality of radially projecting constraint sections 13A at locations corresponding to the clutch weights 20 respectively, and a plurality of hook sections 150. Each hook section 150 is formed with a connecting hole 151. The associated driven plate 12 is formed with a plurality of retention holes 122 corresponding to the connecting holes 151. The paired connecting hole 151 and the retention hole 122, which are respectively formed on the operation-assisting frame 15 of the main driving plate 11 and the associated driven plate 12, are engaged with opposite ends of coil spring based intermediate corotating element 41 that is capable only of limited offsetting shifting. The associated driven plate 12 is pivotally installed with clutch weights 20 through pivot pins 14 with the constraint sections 13A located in and in abutting engagement with the V-shaped engaging slot 21. Thus, when the base plate assembly 10 is accelerated to increase the speed to certain rev high enough, the clutch weights 20 fly centrifugally outward to proceed the engagement and the associated driven plate 12 is subject to a rotation resistance that exceeding a predetermined deformation torque of the coil spring based intermediate corotating element 41, the coil spring based intermediate corotating element 41 will be deformed and an angularly offsetting driving coupling is effected between the main driving plate 11 and the associated driven plate 12, that is the main driving plate will drive the associated driven plate to corotate in an angularly offsetting driving whereby the main driving plate 11 will transfers the torque received from the engine to the constraint sections 13A and thus makes each constraint section 13A abutting against the inclined abutting face 210 of the V-shaped engaging slot 21 of the clutch weigh 20 to enhance the engaging force that each clutch wear pad 22 of the clutch weight 20 applies to the rim 51 of a driven disk 50 and also effect an irreversible engagement of the clutch weight 20 with the rim 51 by means of the pressing effect that constraint section 13A applies to the V-shaped engaging slot 21 of the clutch weight 20 to thereby provide the anti-reversal function to reduce the oscillation frequency, leading to enhancement of smoothness and stability of power transmission and to reduce abrasion and wear of the wear pad 22 of the clutch weight 20. Further, in such a structure, as shown in FIGS. 10-15, the main driving plate 11 is formed a circular bore 130 in the radially projecting constraint sections 13A of the operation-assisting frame 15 and a roller 131 is rotatably mounted in the bore 130 with a rolling surface of the roller 131 engaging with the V-shaped engaging slot 21 of the clutch weight 20 for effecting displacement by rolling so that the inclined abutting face 210 of the V-shaped engaging slot 21 is protected from wear and abrasion.

Further, the structure of the second embodiment has been tested for static engaging torque of which the result is shown in FIG. 21 and road test or field test of which the result is shown in FIG. 22. The test results indicate the improvement of the present invention in the performance of clutch. In the engaging torque test shown in FIG. 21, the pressing force, that is induced by the centrifugal force of the clutch weights, against the rim 51 of the driven disk 50 [clutch bell], is simulatively performed with pneumatic force of an air compressor to generate a pressing force substantially identical to the centrifugal force of the clutch weights. After several runs of test, as indicated in the table of FIG. 21, under different settings of pneumatic force, the engaging torque that the clutch of the present invention applies to the clutch bell is increased more than 30%.

The on road test or field test of FIG. 22 is carried out with motorcycle of model Kymco Grand Dink 250, with two persons riding on the motorcycle and the text is performed on roads of different slopes. The vehicle is put in a standstill condition and the engine is accelerated to one engine revolution speed for vehicle just starting to move. The result is put in comparison with a conventional clutch in the table of FIG. 22, and as indicated in the table, the clutch in accordance with the second embodiment of the present invention for containing with intermediate corotating element (Structure A) and containing without intermediate corotating element (Structure B) realize the effect of enhancing engaging force of clutch weights and provide a sufficient engaging torque to the clutch bell whereby the clutch weights of the clutch in accordance with the present invention are capable to drive the clutch bell to rotate with reduced period of time in which the clutch weights are in slippage condition inside the clutch bell. Thus, the rise of temperature at the interface of the clutch weight of the clutch in accordance with the present invention can be reduced and clutch wear pad of the clutch weight is not readily burn and generate odors and the service life is extended. The test also indicates that the presence of the intermediate corotating element and the deformation setting thereof determine the actuation timing of offsetting driving coupling.

The test also indicates that the conventional clutch, due to the small engaging force provided by the clutch weight, cannot drive the clutch bell to rotate until the engine reaches high revolution whereby the clutch wear pad of the clutch is put in slippage with the clutch bell for a very long period of time so that the interface of the clutch wear pad is subject to a significant rise of temperature and is thus burnt, leading to accelerated wear thereof.

Figure 16:
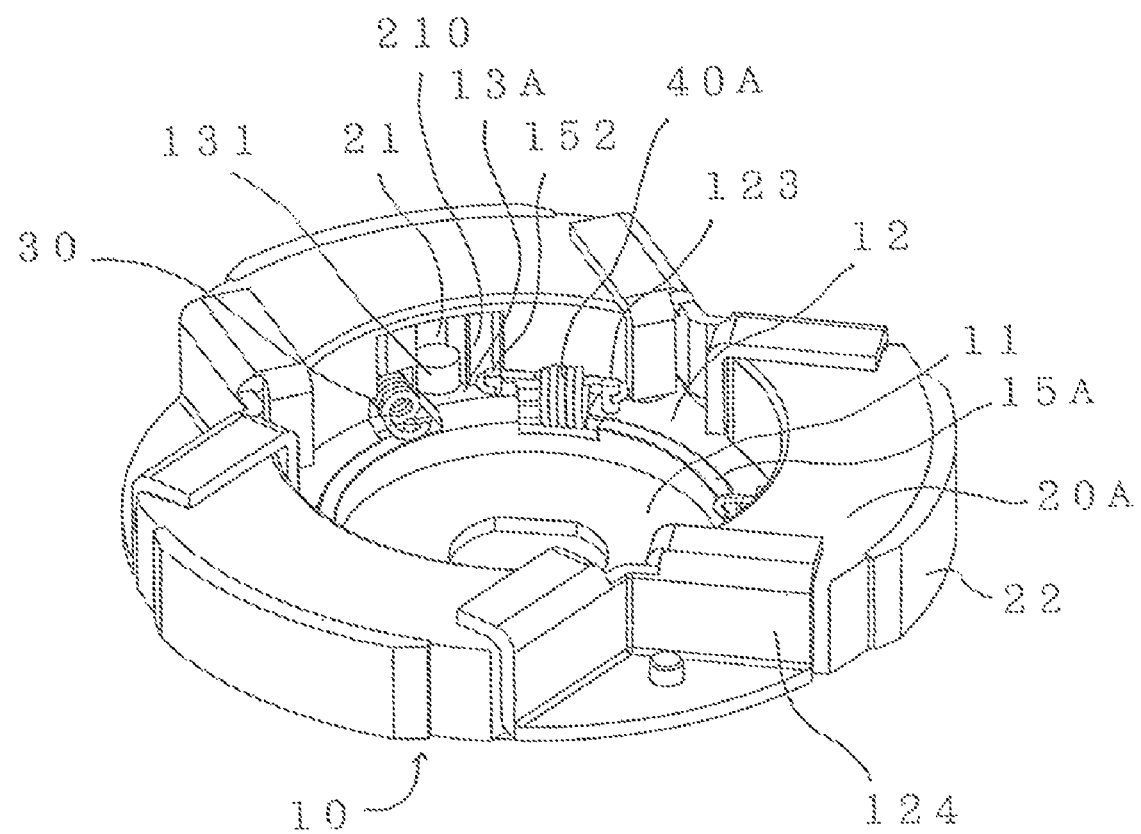
FIG. 16 is a perspective view of a clutch constructed in accordance with a third embodiment of the present invention.
Figure 17:
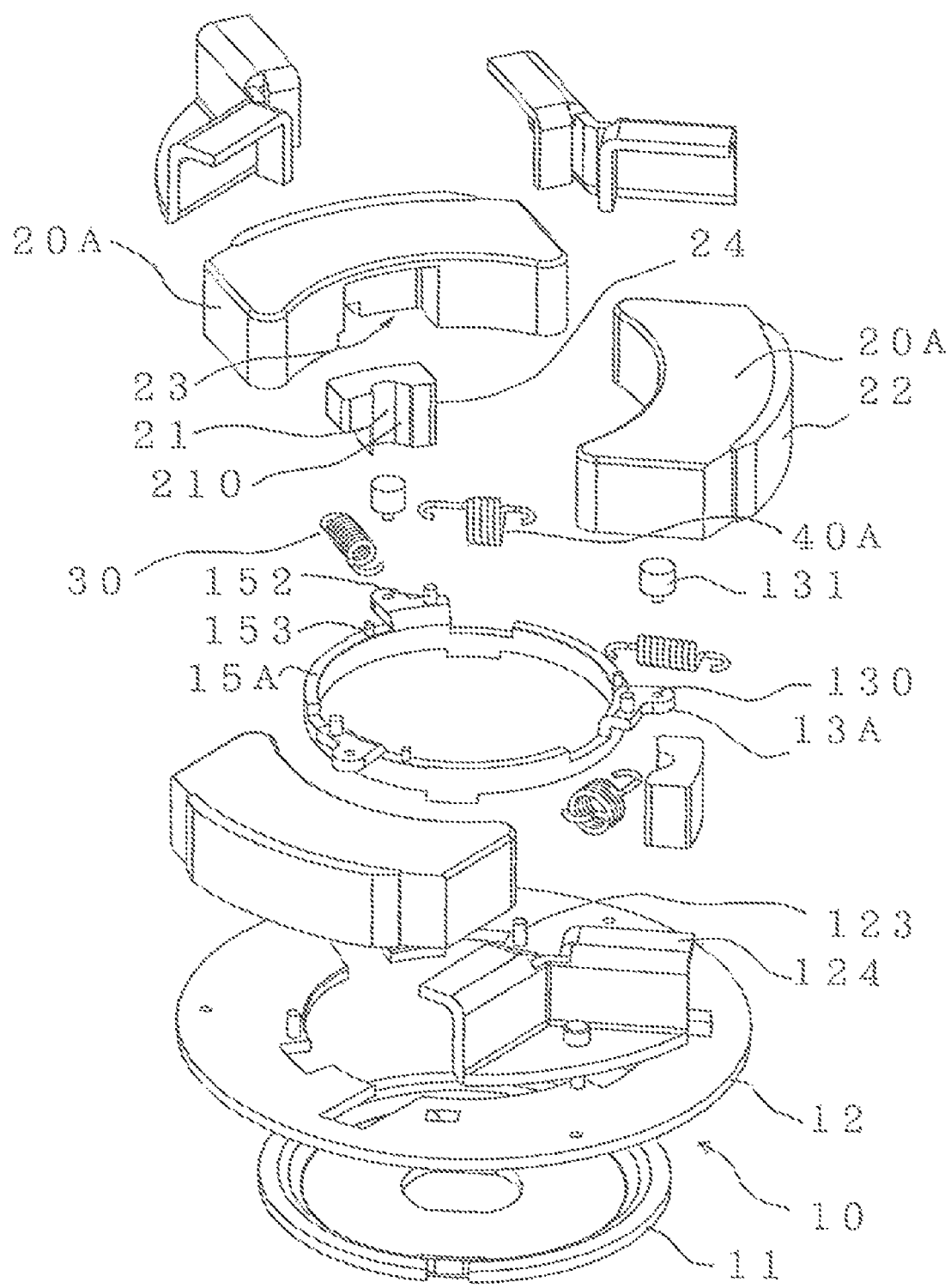
FIG. 17 is an exploded view of the clutch in accordance with the third embodiment of the present invention.
Figure 18:
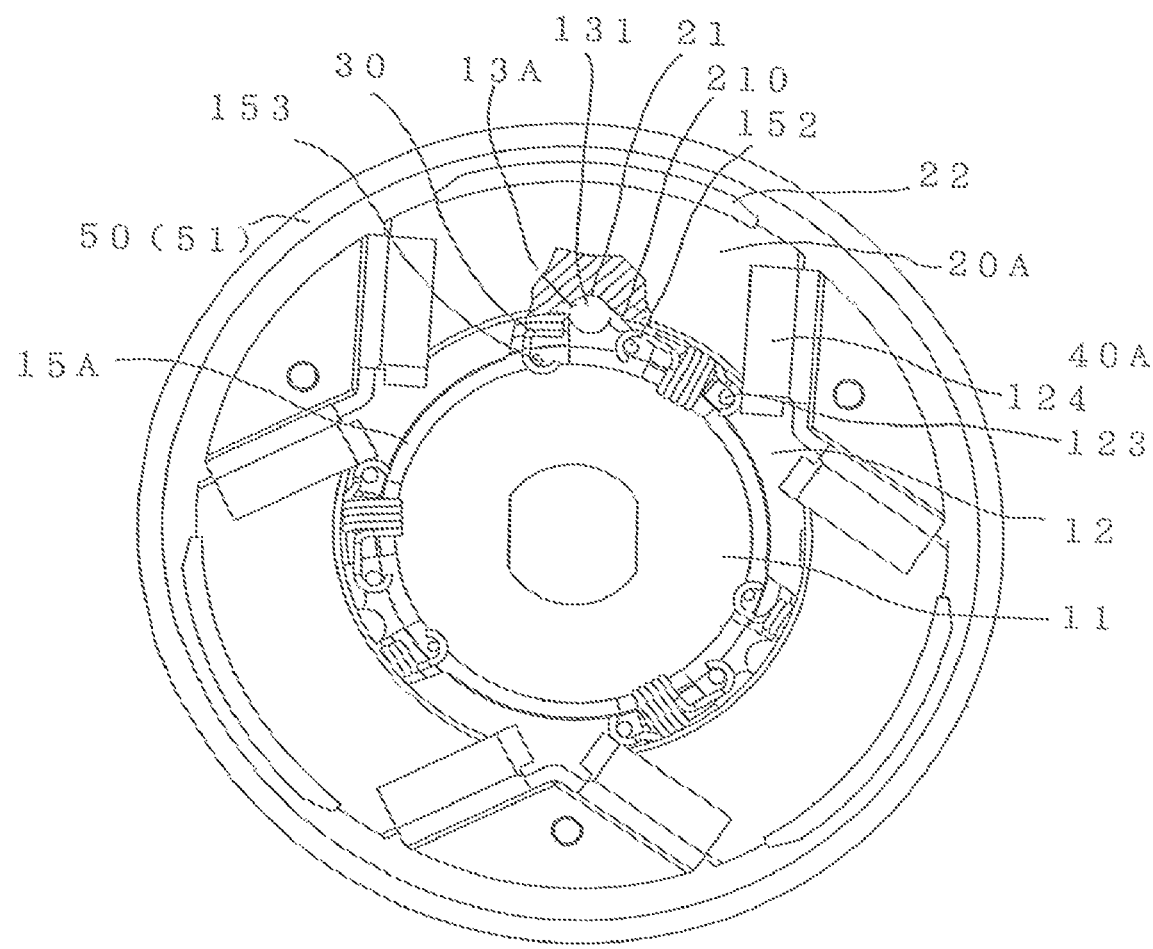
FIG. 18 is a plan view of the clutch in accordance with the third embodiment of the present invention in a condition before operation [clutch weight in closing status]
Figure 19:
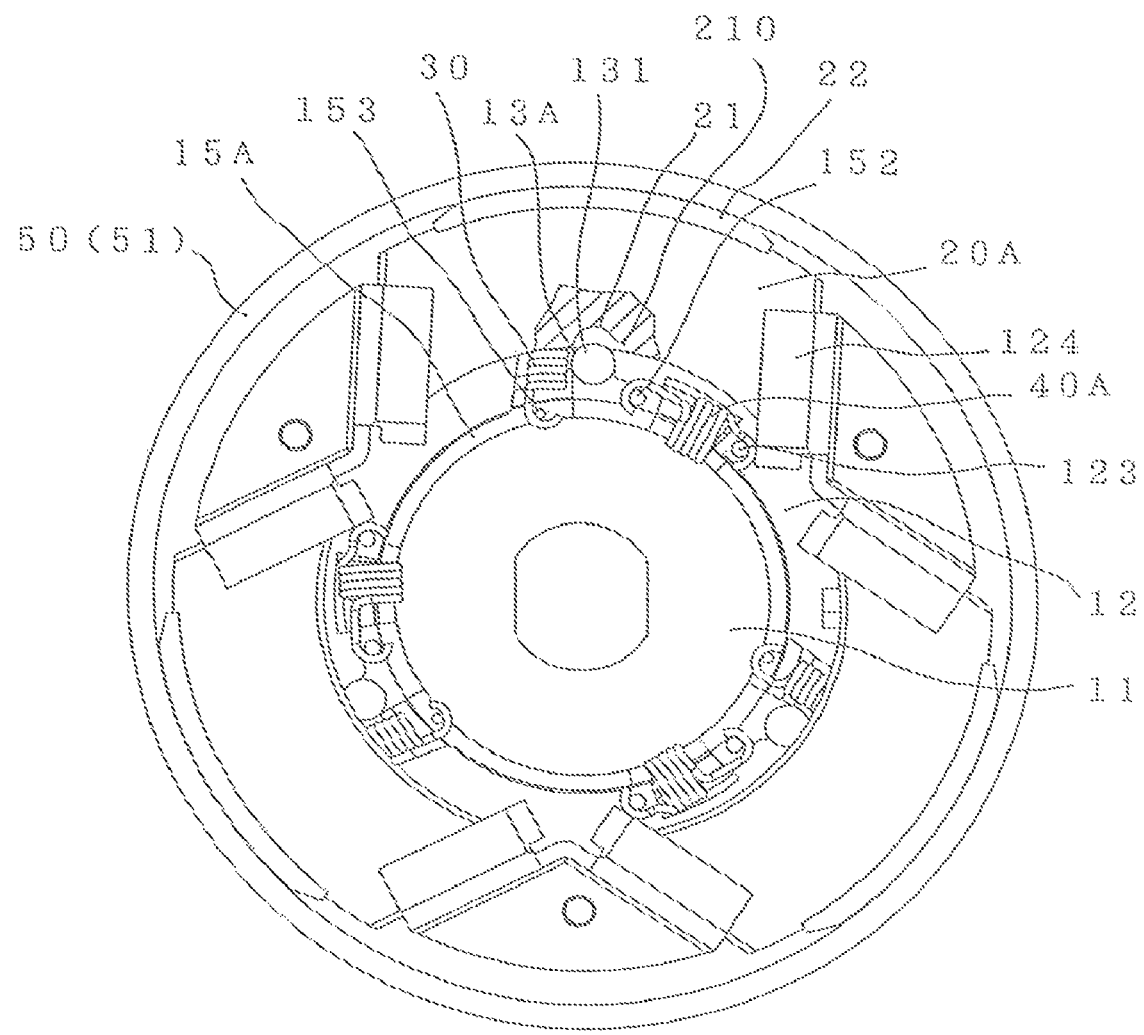
FIG. 19 is a plan view of the clutch in accordance with the third embodiment of the present invention illustrating the clutch in operation [clutch weights in slippery engaging with driven disk but the constraint sections are not actuated]
Figure 20:
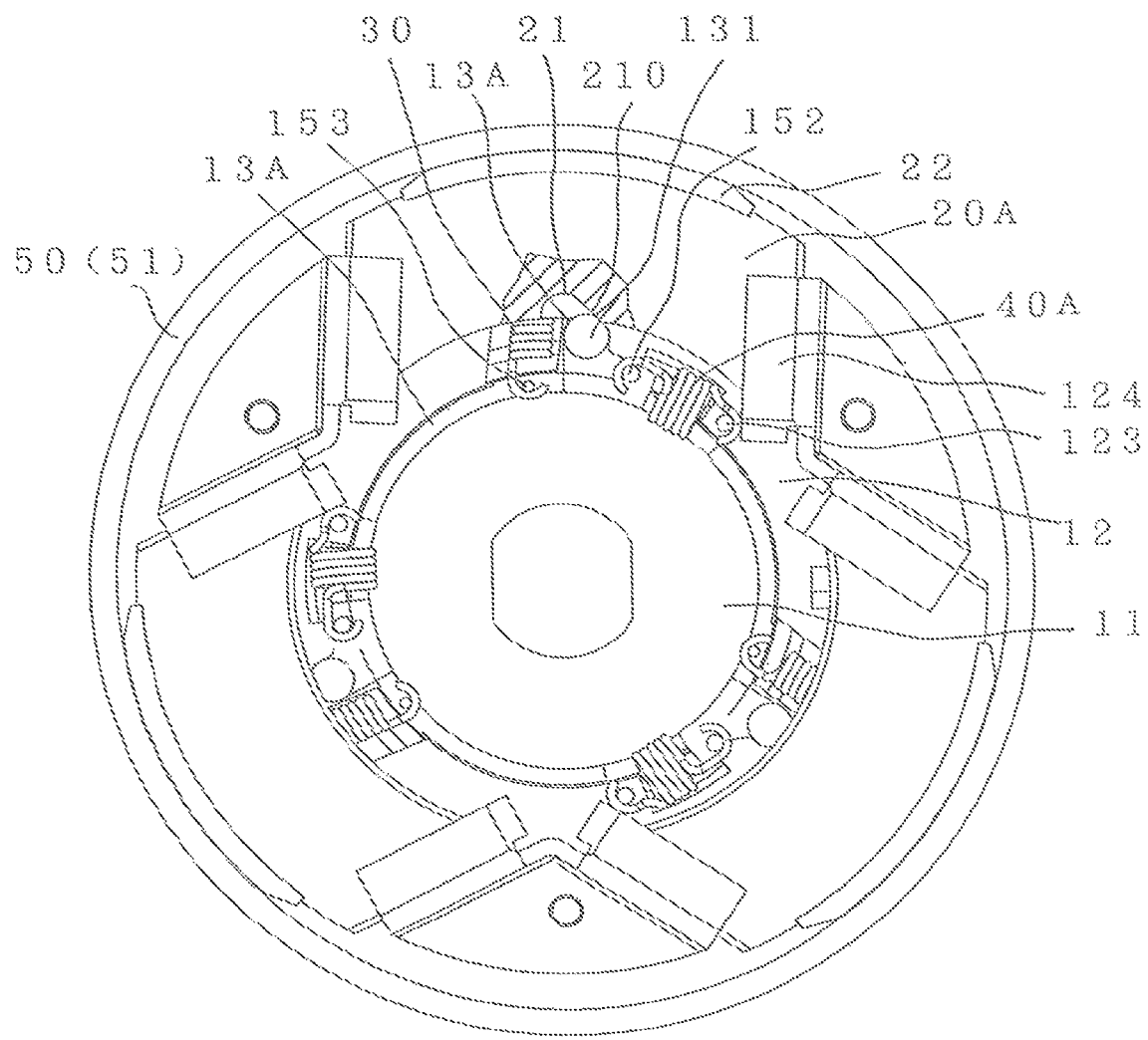
FIG. 20 is another plan view of the clutch in accordance with the third embodiment of the present invention illustrating the clutch in operation [the constraint sections are actuated to press against the engaging slots of clutch weights]

Further, based on the practice of the present invention as discussed above, the present invention can achieve the same effect and function with the following third embodiment thereof, which is shown in FIGS. 16-18. The main driving plate 11 of the base plate assembly 10 is provided with an extended operation-assisting frame 15A and a plurality of intermediate corotating element 40A is arranged between the operation assisting frame 15A and the associated driven plate 12. Thus, the main driving plate 11 that is in rotation can drive the associated driven plate 12 to corotate by means of the operation-assisting frame 15A and the intermediate corotating element 40A. The operation-assisting frame 15A forms a plurality of projecting constraint sections 13A at locations corresponding to clutch weights 20A respectively. The associated driven plate 12 is installed with the clutch weights 20A and each clutch weight formed an engaging slot 21 for being engaged by the projecting constraint section 13A. As shown in FIGS. 18-20, when the base plate assembly 10 that is of variable rotational speed continuously rotates to a predetermined speed, the clutch weights 20A fly outward by centrifugal forces to carry out engagement when the rotation resistance, subjected by the associated driven plate 12, is higher than the predetermined deformation setting of the intermediate corotating element 40A, an angularly offsetting driving coupling is effected between the main driving plate 11 and the associated driven plate 12, whereby the constraint sections 13A of the main driving plate 11 will receive the torque transmitted from the engine and applies a pressing force against the engaging slots 21 of the clutch weights 20 respectively, so that the engaging force of each clutch weight 20A is enhanced with the pressing effect realized by the displacement that each constraint section 13A takes to abut into an inner abutting face 210 of the engaging slot 21 of the respective clutch weight 20.

The present invention can be practiced in a more detailed construction in accordance with the third embodiment discussed above as shown in FIGS. 16-18, wherein the operation-assisting frame 15A of the main driving plate 11 of the base plate assembly 10 is formed with a plurality of first hooking sections 152. The associated driven plate 12 is formed with a plurality of retention sections 123 corresponding to the first hooking sections 152. The opposite ends of each spring based intermediate corotating element 40A are respectively mounted to the respective retention section 123 and the associated first hooking section 152. As shown in FIGS. 18, 19, and 20, when the base plate assembly 10 is gradually increased with the rotational speed thereof to induce the engagement operation of the clutch weights 20 by means of action of centrifugal force, with the associated driven plate 12 being subjected to a rotational resistance that exceeding the predetermined setting of deformation strength of the spring based intermediate corotating element 40A, an angularly offsetting driving coupling is established between the main driving plate 11 and the associated driven plate 12 to let the projecting constraint sections 13A of the main driving plate 11 convert the torque received from the engine into pressing against the inclined abutting face 210 of the V-shaped engaging slot 21 of the clutch weight thereby inducing a pressing effect.

A more detailed structure of the third embodiment of the present invention will be further described, as shown in FIGS. 16-18, wherein the operation-assisting frame 15A of the main driving plate 11 of the base plate assembly 10 is provided with a plurality of second hooking sections 153. The associated driven plate 12 is formed with a plurality of guide frame 124 for mounting the clutch weights 20A. Each clutch weight 20A has a return element 30 that connects the respective second hooking section 153 of the operation-assisting frame 15. Each clutch weight 20A is formed with, at an inside surface thereof, an engaging slot 21 at each location corresponding to the projecting constraint sections 13A so that the projecting constraint sections 13A can be put in abutting engagement with the engaging slots 21 respectively. As such, the engaging force of each clutch weight 20A applies to the rim 51 of the driven disk 50 can be enhanced, while due to the pressing effect provided by the projecting constraint section 13A, the action of displacement and engagement taken by the clutch weight 20A under the guidance of the guide frame 124 is irreversible thereby ensure smoothness and stability of power transmission.

According to the first, second, and third embodiments described above, the present invention can be made more enhanced with the following structure, wherein, as shown in FIGS. 10-14, each clutch weight 20 is formed with a fixing port 23 corresponding to each constraint section 13A and a wear-resistant pillow block 24 is fixed inside the fixing port 23. The wear-resistant pillow block 24 is formed with an engaging slot 21 and each engaging slot 21 is engaged by each respective constraint section 13A. And the engaging slot 21 can be made to be wear resistant and hard to deform. This also includes the benefit of getting different weights of clutch weights and various slope of abutting face 210 of engaging slot 21 by only replacing the wear-resistant pillow block 24. In other words replacing the material or specific gravity of wear-resistant pillow block 24 and the slope of abutting face 210 can achieve the best engaging force in different requirements.

Although the present invention has been described with reference to the preferred embodiments thereof, it is apparent to those skilled in the art that a variety of modifications and changes may be made without departing from the scope of the present invention which is intended to be defined by the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A clutch comprising a base plate assembly in which a plurality of clutch weights is mounted, the clutch weights being each provided with a return element for performing opening/closing operation of the clutch weights when the clutch weights are subject to displacement caused by centrifugal force, wherein the base plate assembly comprises at least one main driving plate and an associated corotating plate, the main driving plate is formed with a constraint section corresponding to each clutch weight; the main driving plate being in driving coupling with an associated driven plate in an offsetting-allowed manner, the clutch weights being installed on the associated corotating plate, each clutch weight is formed with an engaging slot corresponding to the constraint section for engaging with the constraint section, the constraint section receiving a torque from an engine and in response thereto applying a pressing force to the engaging slot of the respective clutch weight whereby by means of the pressing force, induced by the displacement of the constraint section, proceeds thrusting against an abutting face of the engaging slot of the clutch weight, thereby an engaging force of the clutch weight is enhanced and stability of power transmission is improved due to the anti-reversal function ensured by the engaging force.

2. The clutch as claimed in claim 1, wherein a plurality of intermediate corotating elements are arranged between the main driving plate and the associated driven plate and wherein the main driving plate drives the associated driven plate to corotate therewith via the intermediate corotating elements and the intermediate corotating elements are set with a transformation setting that determines the actuation timing when the main driving plate is put into offsetting driving coupling with the associated driven plate.

3. The clutch as claimed in claim 1, wherein the plurality of constraint sections are formed as pins at an inside diameter thereof corresponding to the clutch weights and wherein a plurality of mounting slots for intermediate corotating elements are defined in the main driving plate, the associated driven plate is formed with receiving slots corresponding to the mounting slots, the intermediate corotating elements being arranged between the associated mounting slot and receiving slot, and the engaging slot corresponding to each clutch weight are shaped as a letter "V", which correspond to the pins, to thereby let the pins engage with the engaging slots.

4. The clutch as claimed in claim 3, wherein the main driving plate is formed with a constraint flange along each mounting slot to prevent the respective intermediate corotating element from separation, the intermediate corotating elements comprising a rubber or plastic bar that is resistant to chemicals and is of high flexibility and compressibility.

5. The clutch as claimed in claim 3, wherein the intermediate corotating elements that is arranged between each mounting slot of the main driving plate and the respective receiving slot of the associated driven plate comprises a compression spring.

6. The clutch as claimed in claim 2, wherein the plurality of constraint sections are formed as pins at an inside diameter thereof corresponding to the clutch weights and wherein a plurality of mounting slots for intermediate corotating elements are defined in the main driving plate, the associated driven plate is formed with receiving slots corresponding to the mounting slots, the intermediate corotating elements being arranged between the associated mounting slot and receiving slot, and the engaging slot corresponding to each clutch weight are shaped as a letter "V", which correspond to the pins, to thereby let the pins engage with the engaging slots.

7. The clutch as claimed in claim 6, wherein the main driving plate is formed with a constraint flange along each mounting slot to prevent the respective intermediate corotating element from separation, the intermediate corotating element comprising a rubber or plastic bar that is resistant to chemicals and is of high flexibility and compressibility.

8. The clutch as claimed in claim 6, wherein the intermediate corotating element that is arranged between each mounting slot of the main driving plate and the respective receiving slot of the associate driven plate comprises a compression spring.

9. The clutch as claimed in claim 1, wherein each clutch weight is formed with, in an inside surface thereof, a fixing port corresponding to each constraint section, a wear-resistant pillow block made of wear resistant material and is installed in the fixing port, and a wear-resistant pillow block formed with an engaging slot, which allow the engaging slot respectively be engaged with each constraint member.

10. The clutch as claimed in claim 1, wherein the return element comprises a tension spring.

* * * * *